United States Patent
Stella et al.

(10) Patent No.: US 8,472,176 B2
(45) Date of Patent: Jun. 25, 2013

(54) INTEGRATED POWER ADAPTER SYSTEM FOR PORTABLE COMPUTERS

(75) Inventors: Cristiano Gianluca Stella, San Gregorio di Catania (IT); Giuseppe Consentino, Gravina di Catania (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 203 days.

(21) Appl. No.: 13/184,761

(22) Filed: Jul. 18, 2011

(65) Prior Publication Data

US 2012/0014057 A1    Jan. 19, 2012

(30) Foreign Application Priority Data

Jul. 19, 2010  (IT) .............................. MI2010A1325

(51) Int. Cl.
*G06F 1/16*    (2006.01)

(52) U.S. Cl.
USPC ............ 361/679.27; 361/679.02; 361/679.09; 361/688; 320/64; 320/150; 312/223.1; 312/223.2

(58) Field of Classification Search
USPC ........................................ 361/679.27, 679.28
See application file for complete search history.

(56) References Cited

U.S. PATENT DOCUMENTS

| | | | |
|---|---|---|---|
| 5,955,797 A * | 9/1999 | Kim ............................... | 307/150 |
| 5,983,073 A | 11/1999 | Ditzik ........................... | 455/11.1 |
| 2004/0036819 A1 | 2/2004 | Ryu et al. ......................... | 349/58 |
| 2006/0152908 A1 | 7/2006 | Berstis et al. ................. | 361/725 |
| 2006/0267547 A1 | 11/2006 | Godovich ...................... | 320/107 |
| 2009/0201254 A1 | 8/2009 | Rais ............................... | 345/168 |
| 2009/0243542 A1 | 10/2009 | Chai et al. ..................... | 320/112 |
| 2010/0321865 A1* | 12/2010 | Huang et al. ............. | 361/679.01 |
| 2012/0014057 A1* | 1/2012 | Stella et al. .............. | 361/679.55 |

* cited by examiner

*Primary Examiner* — Anthony Q Edwards
(74) *Attorney, Agent, or Firm* — Allen, Dyer, Doppelt, Milbrath & Gilchrist, P.A.

(57) ABSTRACT

An integrated power adapter system for a portable computer may include a power adapter for providing power to the portable computer, extractable elements for connection to an external socket, and a dissipation grid for reducing the temperature of the cover screen. The power adapter system may be a slim power adapter system being removable from and integrated with the cover screen of the portable computer.

30 Claims, 5 Drawing Sheets

INTEGRATED POWER ADAPTER SYSTEM FOR PORTABLE COMPUTERS

FIELD OF THE INVENTION

The present disclosure relates to an integrated power adapter system for portable computers, and in particular, relates to an integrated power adapter system for portable computers comprising an alternating current/direct current (AC/DC) adapter inside the computer.

BACKGROUND OF THE INVENTION

With more and more people using portable computers, in particular, laptops or notebooks, there may be a desire for shrinking the sizes of such computers to improve their portability and to increase their manageability. Moreover, even if the life of the batteries supplying the portable computers is improved, when a battery is not charged, it is necessary to connect the portable computer to a power supply source, in particular providing a DC current. Up to now, portable computers thus typically involved an AC/DC adapter that extends from a plug (for plugging into a wall outlet of a power supply network or supply mains) to a case, usually in the form of a small brick, and then another plug from the case to a wire which leads to another plug for insertion into the portable computer.

The computer sizes can be reduced by using an integrated power pack and as described in the U.S. Patent Application Publication No. 2009/243542 to Chai et al. In particular, this patent application discloses an apparatus comprising a power pack for providing power to a laptop computer. The power pack may be selectively removable from and integrated with a laptop computer housing; and the power pack may comprise: a power pack housing; a battery pack; and a AC/DC adapter; the battery pack and the AC/DC adapter both being housed within the power pack housing.

This approach has a drawback in that the AC/DC adapter is not physically separated from the primary battery pack, and thus, it is not removable from the laptop housing without extracting also the battery pack. In addition, people may be obliged to carry an external adapter to supply the portable computer with a DC current when the battery is damaged, removed, or discharged. Moreover, the fact that this power pack is inside the laptop housing may increase the temperature of the housing itself. Furthermore, operating the portable computer adjacent the user's body during typical use may not be safe since the AC/DC adapter would be positioned in the bottom part of the laptop case, i.e. close to the user's body.

SUMMARY OF THE INVENTION

The technical problem underlying the present invention is that of providing a power adapter system for portable computers having structural and functional characteristics that allow an approach to the limits affecting the power adapters according to the prior art.

The approach underlying the present invention is that of providing a power adapter system for portable computers which is integrated in the computer, in particular in its cover screen and which is extractable from it, thus allowing to increase the portability and manageability of the computer itself for a final user.

An aspect is directed to a power adapter system for a portable computer that may comprise a power adapter for providing power to portable computer, extractable elements for connection to an external socket, and a dissipation grid for avoiding the increasing of the temperature of the cover screen. The power adapter system may be a slim power adapter system being removable from and integrated with the cover screen of the portable computer. In this way, the portability and manageability of the computer itself for a final user are improved.

More particularly, the following supplemental and optional features taken alone or in combination when needed are now disclosed. According to another embodiment, the power adapter system and the extractable elements can be housed in one of these regions in the cover screen of the portable computer, and in the case of the portable computer.

According to another embodiment, the extractable elements can comprise a winding mechanism for a LAN cable and a grid wire connected with a plug. In this way, the winding mechanism would allow for handling, and connecting the laptop more easily.

Furthermore, according to an aspect, the power adapter can be in direct contact with the dissipation grid. Also according to an aspect of the invention, the dissipation grid can occupy a region in a front side of the cover screen, wherein a screen of the portable computer is also placed, and a rear side of the cover screen.

By positioning of the dissipation grid of the power adapter system and the winding mechanism on the front side of the cover screen, the dimensions of the screen are reduced. While the positioning of the dissipation grid of the power adapter system on the rear side of the cover screen may not reduce the dimensions of the screen.

According to this aspect, the extractable elements can be housed in a region being adjacent to the region which is occupied by the dissipation grid. According to an aspect, the side can have an increased thickness in correspondence of the region housing the extractable elements.

Yet according to another aspect, the power adapter system can be placed in a physically separate area with respect to a battery of the portable computer. In this way, the power adapter system and the battery can be removed separately and no battery damage also impacts the power adapter system.

Moreover, according to another aspect, the power adapter can be an integrated AC/DC power adapter circuit architecture comprising a boost circuit connected to an alternate voltage source being applied to a first and to a second input terminal of the power adapter circuit architecture, and a converter circuit connected to the boost converter circuit and providing a continuous output voltage at a first and a second output terminal to be applied to the portable computer.

According to this aspect of the invention, the power adapter circuit architecture can further comprise a buffer circuit comprising diodes in series to straighten an input waveform and coupled to an electromagnetic interference (EMI) filter, being placed between the input terminals and the boost circuit to eliminate high frequency components of the alternate voltage source. Yet according to this aspect, the boost circuit can be also identified as a power factor control pre-regulator circuit.

Moreover, according to this aspect, the boost circuit can comprise at least a first power metal-oxide semiconductor field effect transistor (MOSFET) having a control terminal connected to a power factor control circuit. In particular, according to a desired working mode, the power factor control circuit may drive the first power MOSFET in a different manner.

Also, according to this aspect, the converter circuit can comprise at least a second power MOSFET having a control terminal connected to a pulse width modulation control circuit. Furthermore, yet according to this aspect, the pulse width modulation control circuit can be in full duplex communication with the power factor control circuit. According to a further aspect, the first and second power MOSFETs can be either an MDmesh™V or FDmesh™II or SuperMESH 5™ power MOSFET housed in a super slim package. Finally, according to an aspect, the converter circuit can comprise a first stage circuit and a second stage circuit coupled to each other by way of a transformer.

The characteristics and advantages of the power adapter system according to the present disclosure will be apparent from the following description of an embodiment thereof given by way of indicative and non limiting example with reference to the annexed drawings.

DETAILED DESCRIPTION OF THE PREFERRED EMBODIMENTS

Figure 1:
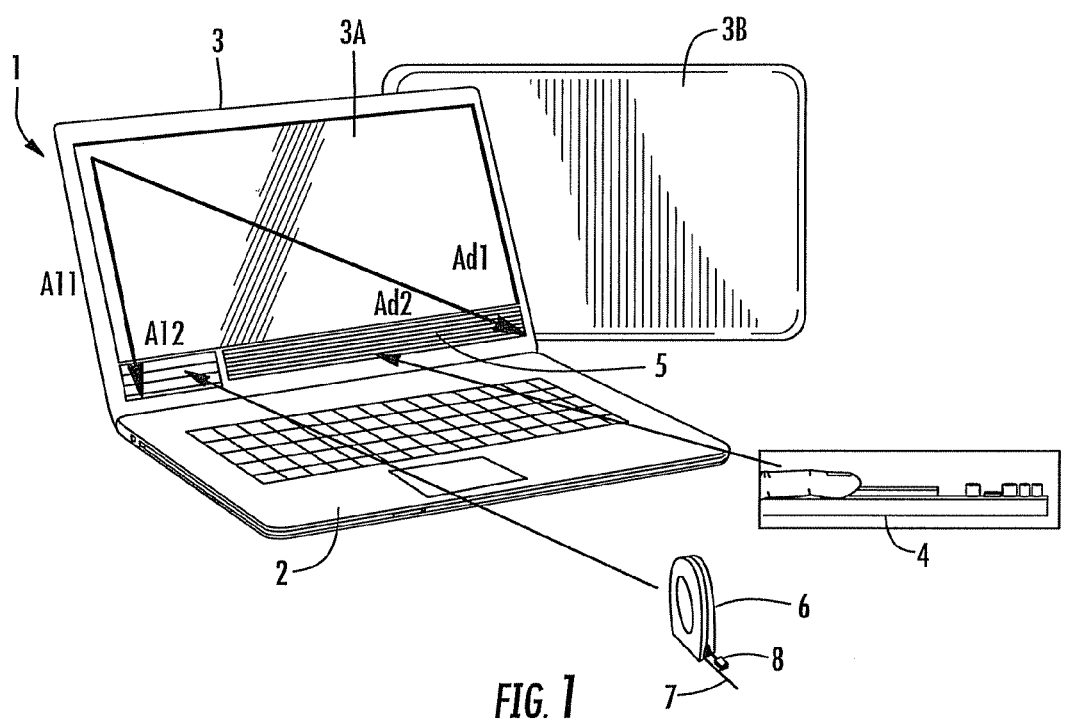
FIG. 1 is a schematic diagram of a portable computer with an integrated power adapter system, according to the present invention.

With reference to such figures, and in particular to FIG. 1, a portable computer comprising at least one slim power adapter system is shown. As will be clear from the following description, advantageously according to the present disclosure, the power adapter system is integrated in the cover screen of the computer and comprises extractable elements, like a winding mechanism, for a LAN cable, a power supply cable, and a plug also inserted into the cover screen. It should be noted that the figures show schematic views of the portable computer, of the power adapter system and of the die package including a power MOSFET device, being used in the power adapter system, and are not drawn in scale, being on the contrary drafted so as to emphasize the features of the invention.

The portable computer, also briefly indicated as laptop 1, comprising a case 2 and a cover screen 3 including a screen 3A, also comprises a slim power adapter 4, being placed inside the cover screen 3 of the laptop 1, in the bottom side, and in direct contact with a dissipation grid 5. In particular, the power adapter 4 and the dissipation grid 5 occupy a first region, for example, the region on the bottom-right of the front side of the cover screen 3 (the side comprising the screen 3A), while a second region, for example, the region on the bottom-left comprises extractable elements or a winding mechanism 6 comprising a LAN cable 7 and a power supply cable connected with a plug 8.

According to another aspect, the winding mechanism 6 is integrated in the case 2 and the power adapter 4 is a slim integrated device. Moreover, the winding mechanism 6 of the LAN cable 7 and a grid wire connected to the plug 8 are extractable elements and are placed in a portion, for example, an end portion of the bottom side of the cover screen 3, a left part, or a right portion of the cover screen 3.

According to an aspect, the new dimensions of the screen 3A, indicated with the arrows Ad1 and Al1 in FIG. 1, are reduced between 5 and 20 percent with respect to the dimensions of an original screen, indicated with the arrows Ad2 and Al2 in FIG. 1. It is clear that the lengths indicated by the arrows Ad1, Al1 as well as by the arrows Ad2 and Al2 depend on the actual sizes of the laptop 1 and in particular of the sizes of its cover screen 3.

In particular, according to an aspect of the present disclosure and to the embodiment shown in FIG. 1, the reduction of the sizes of the screen 3A of the computer 1 are due to the positioning of the dissipation grid 5, which is attached on the front side of the cover screen 3, in particular in the region on the right of the bottom side of such cover screen 3.

Figures 2A, 2B, 2C, 2D:
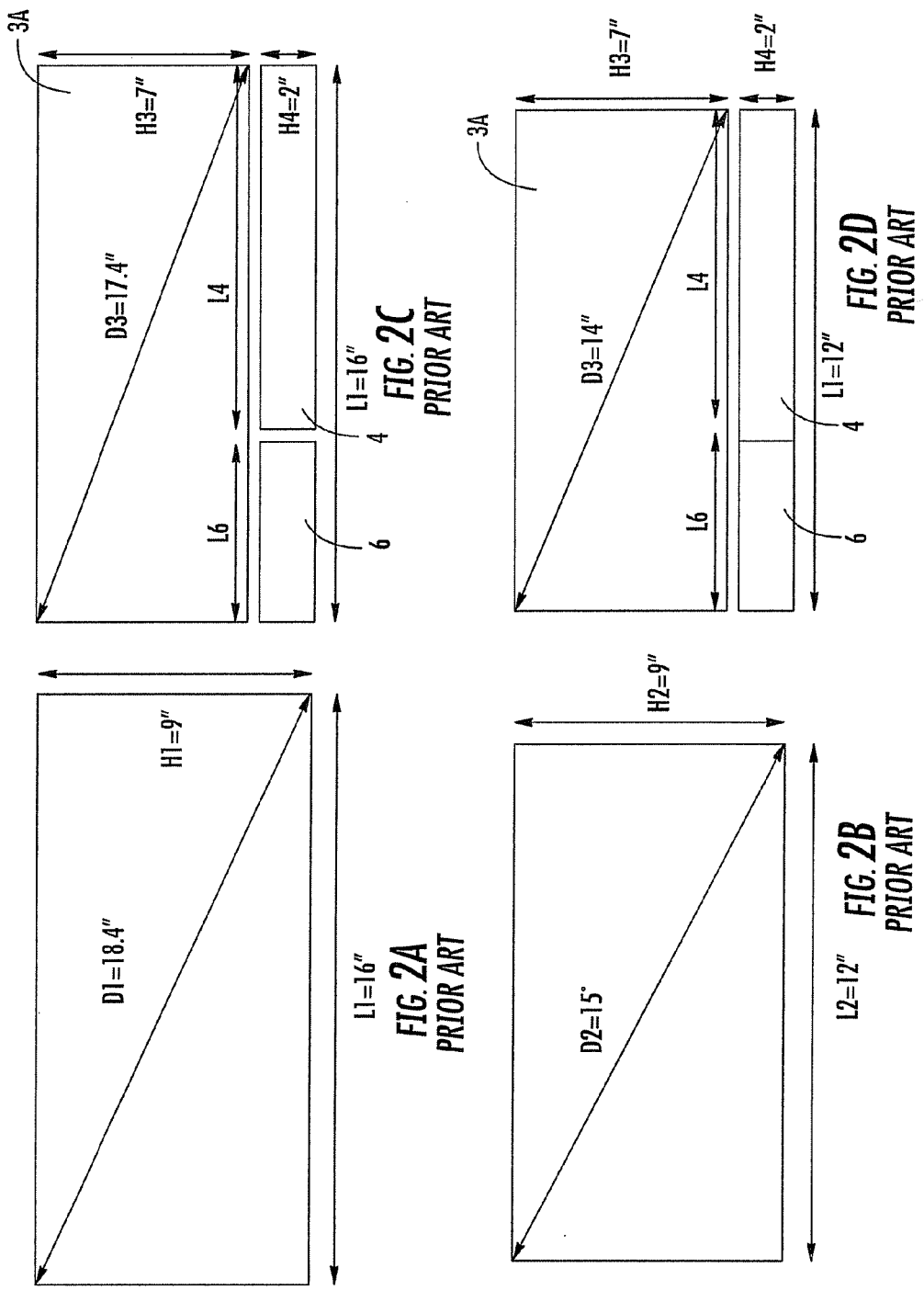
FIGS. 2A-2B and 2C-2D are schematic diagrams of the dimensions of a screen of a portable computer according to the prior art, and a screen of a portable computer with an integrated power adapter system, according to the present invention, respectively and according to different embodiments.

FIGS. 2A-2D schematically show the dimensions of a screen of two different embodiments of a computer being realized according to the prior art (FIGS. 2A and 2B) and according to the present disclosure (FIGS. 2C and 2D). In particular, according to a first embodiment, a screen of 18.4" (46.74 cm) has a diagonal D1=18.4" (46.74 cm), a length L1=16" (40.64 cm), and a height H1=9" (22.86 cm), as shown in FIG. 2A.

According to the present disclosure, by positioning of the dissipation grid 5 of the power adapter 4 and the winding mechanism 6 on the front side of the cover screen 3, the dimensions of the screen 3A are reduced to a diagonal D3=17.4" (44.2 cm) due to the reduction of the height to H3=7" (17.78 cm), the length L1=16" (40.64 cm) being left unchanged. This reduction is due to the height H4=2" (5.08 cm) of the power adapter 4 and the winding mechanism 6, which have lengths L4 and L6, respectively, whose sum is equal to L1, as shown in FIG. 2C.

A similar reduction is obtained by starting from a screen of 15" (38.1 cm), which has a diagonal D2=15" (38.1 cm), a length L2=12" (30.48 cm) and a height H2=H1=9" (22.86 cm), as shown in FIG. 2B. In this case, due to the height H4=2" (5.08 cm) of the power adapter 4 and the winding mechanism 6, the new screen diagonal is D3=14", its height being reduced to H3=7" (17.78 cm) and its length L2=12" (30.48 cm) being left unchanged, as shown in FIG. 2D. Also, in this embodiment, the power adapter 4 and the winding mechanism 6 should have lengths L4 and L6, respectively, whose sum is equal to L2.

Figure 3:
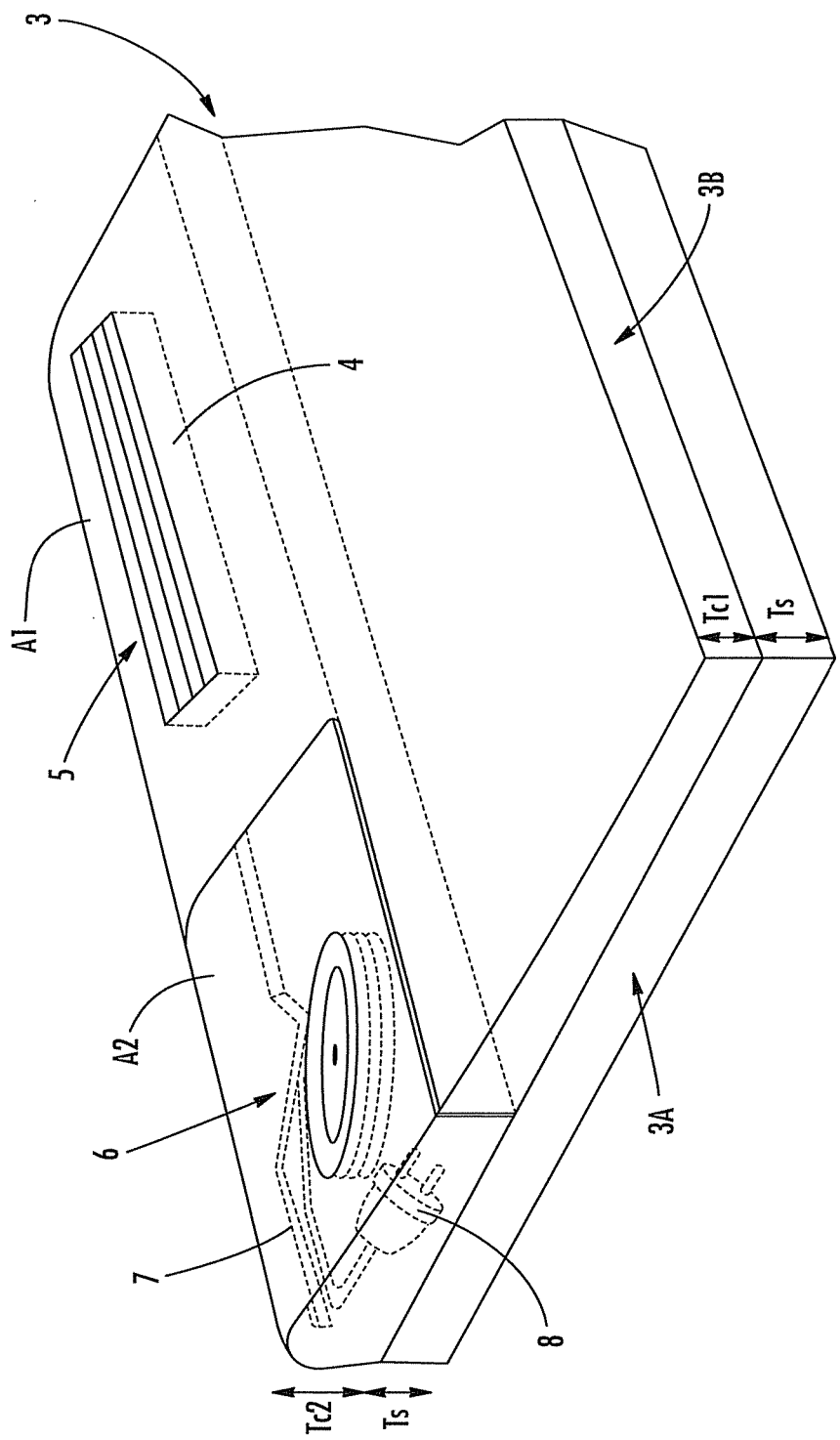
FIG. 3 is a schematic diagram of a view of the portable computer with an alternative embodiment of the integrated power adapter system of FIG. 1.

According to an alternative embodiment, as shown in FIG. 3, the power adapter 4 and the winding mechanism 6 are housed in a bottom portion of a rear side 3B of the cover screen 3. More in particular, the power adapter 4 and the dissipation grid 5 occupy a first region A1, for example, the region on the bottom-right of the rear side 3B of the cover screen 3, while a second region A2, for example, the region on the bottom-left comprises the winding mechanism 6.

It is evident that the housing of the power adapter 4 and of the winding mechanism 6 according to this alternative embodiment does not reduce the dimensions of the screen 3A. However, in order to correctly house the power adapter 4 and the winding mechanism 6, the rear side 3B of the cover screen 3 has an increased thickness. More particularly, according to the embodiment shown in FIG. 3, the thickness of this rear side 3B increases from a first value Tc1 to a second value Tc2, for example, equal to 0.4" (1.02 cm) and 1" (2.54 cm), respectively. Also according to the embodiment shown in FIG. 3, the front side, i.e. the screen 3A has a constant thickness Ts, for example, equal to 0.6" (1.52 cm).

More particularly, the slim integrated power adapter 4 works in order to charge a computer battery, not showed in the figures, and being placed in physically separated areas. In particular, according to an embodiment, the slim integrated power adapter 4 is placed in the cover screen 3 while the battery is usually placed inside the case 2.

Figure 4:
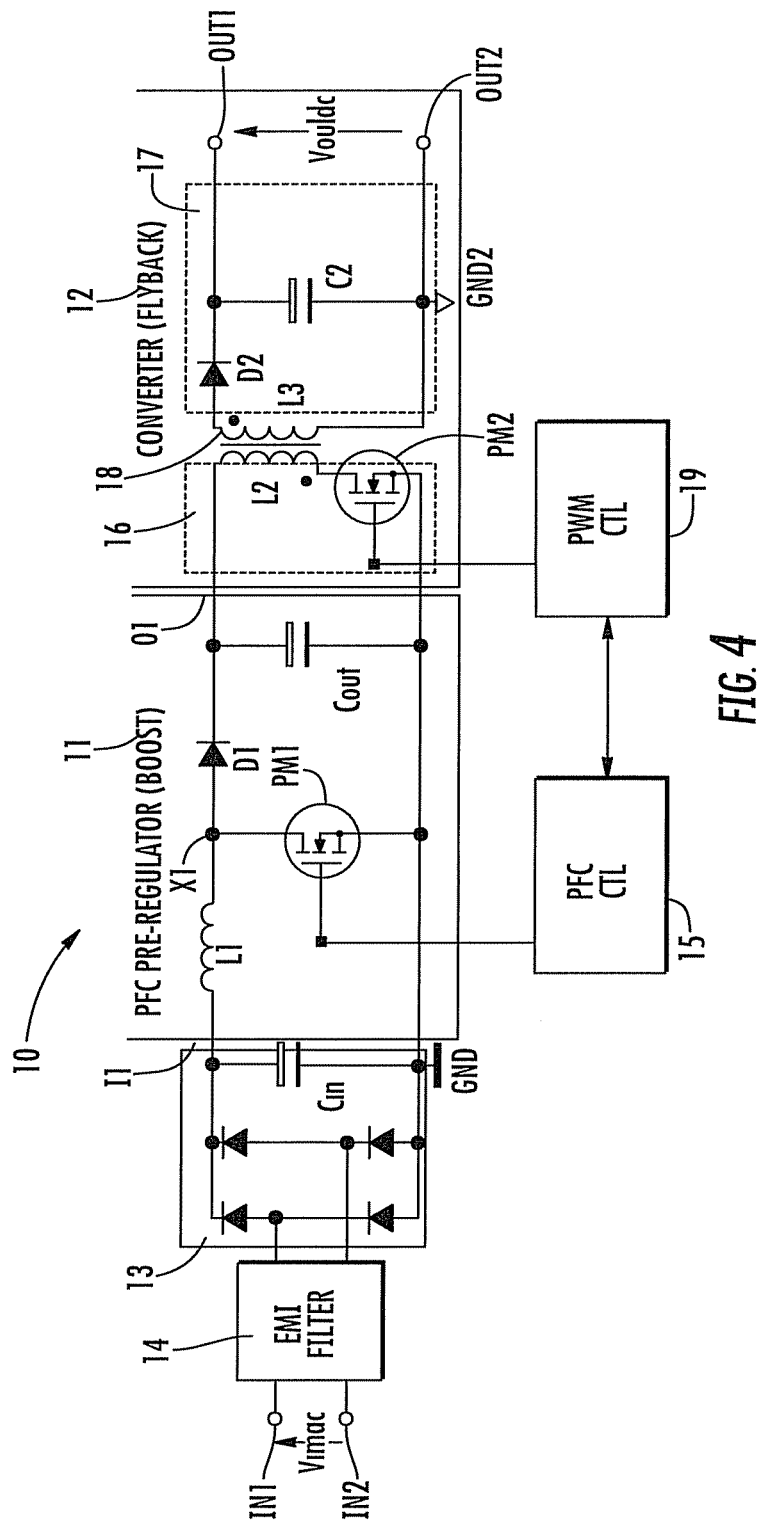
FIG. 4 is a schematic circuit diagram of an integrated power adapter architecture, according to the present invention.

A detailed block diagram of a circuit architecture implementing a slim integrated power adapter 4 according to the present disclosure is shown in FIG. 4. In particular, the block diagram is an AC/DC circuit architecture, also indicated as power adapter circuit architecture 10, comprising a boost circuit 11, for example, a power factor control (PFC) pre-regulator circuit, and a converter circuit 12, for example, a flyback converter. The boost circuit 11 is connected, via a buffer circuit 13, comprising, for example, a parallel coupling of two diodes in series, to an EMI filter 14, which is coupled with an alternate source of a voltage Vinac being applied to a first and to a second input terminal, IN1 and IN2 respectively, of the power adapter circuit architecture 10 and which attenuates possible noise signal affecting the alternate source of the voltage Vinac.

In particular, the EMI filter 14 allows for elimination of the high frequency components of the alternate source of the voltage Vinac, which could resonate within the power adapter circuit architecture 10 while the buffer circuit 13 allows smoothing of the input waveform, the diodes only leaving the positive half-waves and the capacitor transforming it into a continuous waveform.

The boost circuit 11 is a DC/DC converter that comprises at least an inductor L1 and a boost diode D1 being series connected between an input terminal I1 and an output terminal O1, which terminals are in turn connected to a voltage reference, in particular ground GND, by way of input and output capacitors Cin, Cout respectively. The boost circuit 11 provides an output voltage across the output capacitor Cout being higher than the input one across the input capacitor Cin. According to the present disclosure, the boost circuit 11 also comprises, as a switch, a first power MOSFET PM1, and in particular either a MDmesh™V or FDmesh™II or Super-MESH 5™ power MOSFET, being connected to an intermediate node between the inductor L1 and the boost diode D1 and ground GND and having a control or gate terminal connected to a PFC control circuit (PFC CTL) 15.

Figure 5A:
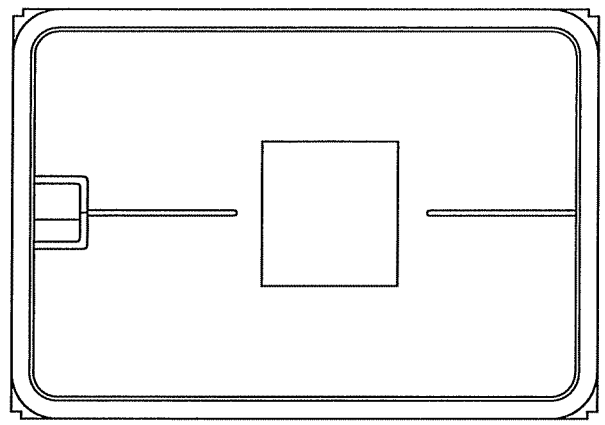
FIGS. 5A-5C are schematic diagrams of a top plan view, a 3D top plan view, and a 3D bottom view of a die package including a power MOSFET device, being used in the power adapter system, according to the present invention.
Figure 5B:
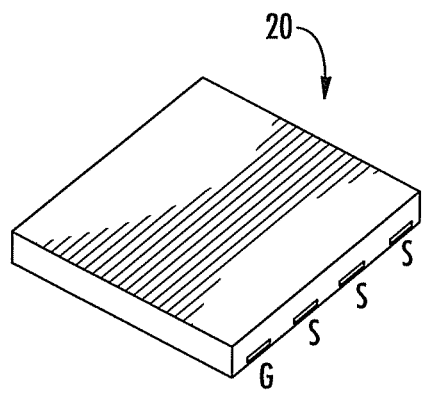
Figure 5C:
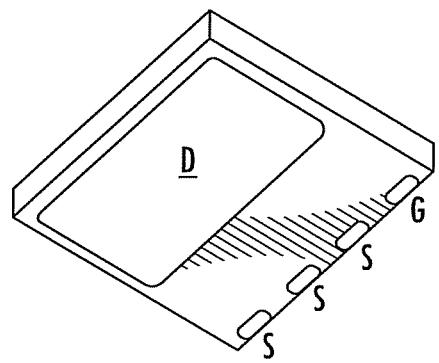

Also according to an aspect of the present disclosure, the first power MOSFET PM1 is housed in a super slim Power-FLAT™ 8×8 HV package 20, as shown in FIGS. 5A-5C in its top view (FIG. 5A), 3D top view (FIG. 5B) and 3D bottom view with one gate contact G, one drain contact D and three source contacts S (FIG. 5C).

According to an aspect of the present disclosure the Pow-erFLAT™ 8×8 HV package 20 has a thickness equal to 1 mm standard flat. A slim package, such as the STMicroelectronics' PowerFLAT™ 8×8 HV package, except for the similar Infineon's ThinPAK package, can be found in the market. Due to the energy accumulated by the inductance L1 of the boost circuit 11, during the phase ON, the current flowing through the inductor L1 cannot go to zero instantaneously. The consequence of this phenomenon is an extra voltage applied to the boost diode D1, in particular, to its anode terminal, with a sign able to oppose to the decreasing current. Due to the extra voltage, the anode of the boost diode D1 will be brought to a voltage higher than the output one, permitting to the current to flow through it.

Moreover, according to the present disclosure, the first power MOSFET PM1 is driven, in a typical manner, by the PFC control circuit 15, which is turned off when a load applied to the power adapter circuit architecture 10 is light to obtain an easy compliance with the energy saving requirements of the power adapter 4. More particularly, the PFC control circuit 15 acts on the duty cycle or on the frequency of the first power MOSFET PM1 commutation to build a sinusoidal current shape.

As is known, the boost circuit 11 works in two modes: a discontinuous conduction mode (DCM), in which the current flowing in the inductor L1 reaches zero; and a continuous conduction mode (CCM), in which the current flowing in the inductor L1 never reaches zero. According to a desired working mode, the PFC control circuit 15 drives the first power MOSFET PM1 in a different manner.

The flyback converter 12 in turn comprises a first stage circuit 16 inserted between the output terminal O1 of the boost circuit 10 and ground GND, and a second stage circuit 17 coupled to the first stage circuit 16 through a transformer 1B. In particular, the first stage circuit 16 comprises, in series with a primary winding L2 of the transformer 18, a second power MOSFET PM2, as a switch, being for example, of the same type of the first power MOSFET PM1 (and thus either a MDmesh™V or FDmesh™II or SuperMESH 5™ power MOSFET), as all available from STmicroelectronics of Geneva, Switzerland, and suitably having a different breakdown voltage BV. For example, the breakdown voltage BV of the first power MOSFET PM1 is chosen in the range between 525 and 650 Volts while the breakdown voltage BV of the second power MOSFET PM2 is chosen equal to or higher than 800 Volt. The second power MOSFET PM2 is connected in series with the primary winding L2 between the output terminal O1 of the primary winding L2 and a further ground GND2 and is driven by a pulse width modulation or PWM control circuit (PWM CTL) 19, which is connected to a control or gate terminal of the second power MOSFET PM2 and in full duplex communication with the PFC control circuit 15. In particular, in order to maintain safety conditions, the PWM control circuit 19 is turned off if the PFC control circuit 15 operates in an anomalous way.

The second stage circuit 17 comprises a synchronous rectification circuit, in particular, a freewheeling diode D2, which is connected to a secondary winding L3 of the transformer 18 and to a first output terminal OUT1 of the flyback converter 12 (which corresponds to the output terminal of the power adapter circuit architecture 10) as well as an output capacitance C2, which is connected between the first output terminal OUT1 and a further ground GND2.

The flyback converter 12 has two operating phases, depending on the working conditions of the second power MOSFET PM2: a switch on phase, in which the energy is stored on the primary winding L2 of the transformer 18 and on the output of the secondary winding L3. The freewheeling diode D2 is blocked and a load, being connected to the first output terminal OUT1 and to a second output terminal OUT2 of the flyback converter 12, is supplied by way of the output capacitance C2. The second phase is a switch off phase, in which, as soon as the second power MOSFET PM2 turns off, the stored energy on the primary winding L2 is transferred to the secondary winding L3 by magnetic coupling. The freewheeling diode D2 is forward biased, thus the energy is supplied to the output capacitance C2 and to the load of flyback converter 12. The output voltage of the second stage circuit 17 is a DC voltage Voutdc to be provided to the load, in particular, to the portable computer 1.

According to a first aspect of the present disclosure, the power provided from the slim integrated power adapter architecture 10 is comprised between 0 Watt and 90 Watt. In essence, the power adapter system according to the present disclosure allows portable computers, in particular laptops, to be more compact, manageable and portable. Another advantage is that the winding mechanism for power supply cable and LAN cable allows for easy handling, and connecting of the laptop.

Moreover, the power adapter system, being integrated inside the cover screen of the portable computer may contribute to increase in the heat dissipation capability versus the approach of the prior art, in which the power adapter is integrated with the battery in the battery pack, contained in the case on the bottom of the portable computer.

In addition, being that the power adapter system is physically separated from the battery, they can be removed separately and battery damage does not also impact the power adapter system. In addition, the integration of the power adapter system according to the present disclosure comprising also the integration of a dissipation grid may avoid the increasing of the temperature of the cover screen. Even when the dissipation grid is housed on the front side, i.e. the screen side of the cover screen of the portable computer, it reduces the screen dimensions a minimum quantity, while the integration of the power adapter system with the dissipation grid in the rear side of the cover screen does not involve any reduction of the screen dimensions.

That which is claimed:

1. A power adapter system for a portable computer having a screen and a first housing carrying the screen, the power adapter system comprising:
    a power adapter configured to be positioned in the first housing and to provide power to the portable computer;
    at least one extractable element configured to be coupled between a power source and said power adapter; and
    a thermal dissipater coupled to said power adapter.

2. The power adapter system according to claim 1 wherein the portable computer comprises a second housing, and a hinge rotatably coupling the first and second housings; and
    wherein said at least one extractable element is carried by one of the first and second housings of the portable computer.

3. The power adapter system according to claim 1 wherein said at least one extractable element comprises a plurality thereof, said plurality of extractable elements comprises a local area network (LAN) cable, and a power cable with associated plug to be coupled to the power source.

4. The power adapter system according to claim 1 wherein said power adapter is in direct contact with said thermal dissipater.

5. The power adapter system according to claim 1 wherein said thermal dissipater is carried in a front side of the first housing and adjacent the screen.

6. The power adapter system according to claim 1 wherein said thermal dissipater is carried in a back side of the first housing.

7. The power adapter system according to claim 1 wherein said at least one extractable element is adjacent said thermal dissipater.

8. The power adapter system according to claim 7 wherein the first housing has an increased thickness in correspondence with said at least one extractable element.

9. The power adapter system according to claim 1 wherein the portable computer comprises a battery; and wherein said power adapter is separate from the battery.

10. The power adapter system according to claim 1 wherein said power adapter comprises an integrated alternating current/direct current (AC/DC) power adapter circuit.

11. The power adapter system according to claim 10 wherein said AC/DC power adapter circuit comprises:
    first and second input terminals;
    first and second output terminals;
    a booster circuit configured to be coupled to an AC voltage source via said first and second input terminals; and
    a converter circuit configured to be coupled to said booster circuit and to provide a continuous output voltage at said first and second output terminals for powering the portable computer.

12. The power adapter system according to claim 11 wherein said AC/DC power adapter circuit comprises a power factor control circuit; and wherein said booster circuit comprises at least one first power metal-oxide semiconductor field effect transistor (MOSFET) having a control terminal configured to be coupled to said power factor control circuit.

13. The power adapter system according to claim 11 wherein said AC/DC power adapter circuit comprises a pulse width modulation (PWM) circuit; and wherein said converter circuit comprises at least one second power MOSFET having a control terminal configured to be coupled to said PWM circuit.

14. The power adapter system according to claim 12 wherein said at least one first power MOSFET comprises at least one of a MDmesh™V power MOSFET, a FDmesh™ II power MOSFET, or a SuperMESH 5 ™ power MOSFET carried in a PowerFLAT™ 8×8 package.

15. A power adapter system for a portable computer having a screen, a first housing carrying the screen, a second housing, and a hinge rotatably coupling the first and second housings, the power adapter system comprising:
    an integrated circuit (IC) power adapter configured to be positioned in the first housing and to provide power to the portable computer;
    a plurality of extractable elements configured to be coupled between a power source and said IC power adapter; and
    a thermal dissipater configured to be coupled to said IC power adapter.

16. The power adapter system according to claim 15 wherein said plurality of extractable elements are carried by one of the first and second housings.

17. The power adapter system according to claim 15 wherein said plurality of extractable elements comprises a local area network (LAN) cable, and a power cable with associated plug to be coupled to the power source.

18. The power adapter system according to claim 15 wherein said IC power adapter is in direct contact with said thermal dissipater.

19. The power adapter system according to claim 15 wherein said thermal dissipater is carried in a front side of the first housing and adjacent the screen.

20. The power adapter system according to claim 15 wherein said thermal dissipater is carried in a back side of the first housing.

21. The power adapter system according to claim 15 wherein said plurality of extractable elements is adjacent said thermal dissipater.

22. A portable computer device comprising:
    a screen;
    a first housing carrying said screen;
    a second housing;
    a hinge configured to rotatably couple said first and second housings; and
    a power adapter system comprising
        an integrated circuit (IC) power adapter configured to be positioned in said first housing and to provide power thereto,
        a plurality of extractable elements configured to be coupled between a power source and said IC power adapter, and a thermal dissipater configured to be coupled to said IC power adapter.

23. The portable computer device according to claim 22 wherein said plurality of extractable elements are carried by one of the first and second housings.

24. The portable computer device according to claim 22 wherein said plurality of extractable elements comprises a local area network (LAN) cable, and a power cable with associated plug to be coupled to the power source.

25. The portable computer device according to claim 22 wherein said IC power adapter is in direct contact with said thermal dissipater.

26. The portable computer device according to claim 22 wherein said thermal dissipater is carried in a front side of said first housing and adjacent said screen.

27. A method of making a power adapter system for a portable computer having a screen and a first housing carrying the screen, the method comprising:

positioning a power adapter in the first housing to provide power to the portable computer;
coupling at least one extractable element between a power source and the power adapter; and
coupling a thermal dissipater to the power adapter.

28. The method according to claim 27 wherein the portable computer comprises a second housing, and a hinge rotatably coupling the first and second housings; and wherein the at least one extractable element is to be carried by one of the first and second housings of the portable computer.

29. The method according to claim 27 wherein the at least one extractable element comprises a plurality thereof, the plurality of extractable elements comprises a local area network (LAN) cable, and a power cable with associated plug to be coupled to the power source.

30. The method according to claim 27 further comprising positioning the power adapter in direct contact with the thermal dissipater.

\* \* \* \* \*